US010055681B2

(12) United States Patent
Brown et al.

(10) Patent No.: US 10,055,681 B2
(45) Date of Patent: Aug. 21, 2018

(54) MAPPING ACTIONS AND OBJECTS TO TASKS

(71) Applicant: Verint Americas Inc., Alpharetta, GA (US)

(72) Inventors: Fred A Brown, Colbert, WA (US); Tanya M Miller, Colbert, WA (US); Megan Brown, Colbert, WA (US); Verlie Thompson, Spokane, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 190 days.

(21) Appl. No.: 14/069,074

(22) Filed: Oct. 31, 2013

(65) Prior Publication Data
US 2015/0121216 A1 Apr. 30, 2015

(51) Int. Cl.
G06F 3/048 (2013.01)
G06N 3/00 (2006.01)
H04M 3/527 (2006.01)
G06F 17/28 (2006.01)
G10L 15/26 (2006.01)

(52) U.S. Cl.
CPC ............ *G06N 3/006* (2013.01); *G06N 3/008* (2013.01); *G06F 17/28* (2013.01); *G10L 15/26* (2013.01); *H04M 3/527* (2013.01)

(58) Field of Classification Search
CPC ........ G10L 15/26; G06N 3/006; G06N 3/008; G06F 9/4446; G06F 17/28; H04M 3/527
USPC ...................................................... 715/708
See application file for complete search history.

(56) References Cited

U.S. PATENT DOCUMENTS

| | | | |
|---|---|---|---|
| 8,677,377 B2 | 3/2014 | Cheyer et al. | |
| 9,082,402 B2* | 7/2015 | Yadgar | H04M 3/4936 |
| 9,552,350 B2* | 1/2017 | Brown | G06F 17/273 |
| 9,575,964 B2* | 2/2017 | Yadgar | G10L 15/1822 |
| 2003/0191629 A1* | 10/2003 | Yoshizawa | G10L 15/22 704/10 |
| 2004/0153321 A1* | 8/2004 | Chung | G10L 15/22 704/251 |
| 2007/0022073 A1* | 1/2007 | Gupta | G06N 5/022 706/45 |
| 2008/0267365 A1* | 10/2008 | Bushey | G10L 15/197 379/88.04 |
| 2009/0254336 A1* | 10/2009 | Dumais | G06F 9/4443 704/9 |
| 2012/0265528 A1* | 10/2012 | Gruber et al. | 704/235 |
| 2013/0346068 A1* | 12/2013 | Solem et al. | 704/9 |
| 2014/0037076 A1* | 2/2014 | Bouzid | H04M 3/42204 379/88.03 |
| 2014/0040748 A1* | 2/2014 | Lemay et al. | 715/728 |

(Continued)

Primary Examiner — Patrick F Riegler
(74) Attorney, Agent, or Firm — Meunier Carlin & Curfman

(57) ABSTRACT

Techniques for mapping actions and objects to tasks may include identifying a task to be performed by a virtual assistant for an action and/or object. The task may be identified based on a task map of the virtual assistant. In some examples, the task may be identified based on contextual information of a user, such as a conversation history, content output history, user preferences, and so on. The techniques may also include customizing a task map for a particular context, such as a particular user, industry, platform, device type, and so on. The customization may include assigning an action, object, and/or variable value to a particular task.

18 Claims, 7 Drawing Sheets

(56) References Cited

U.S. PATENT DOCUMENTS

| | | | |
|---|---|---|---|
| 2014/0115456 A1* | 4/2014 | White | G10L 15/22 |
| | | | 715/708 |
| 2014/0164953 A1* | 6/2014 | Lynch | H04L 51/046 |
| | | | 715/753 |
| 2014/0249830 A1* | 9/2014 | Gallopyn | G06F 19/345 |
| | | | 705/2 |
| 2014/0310005 A1* | 10/2014 | Brown | G06F 17/273 |
| | | | 704/275 |
| 2014/0371907 A1* | 12/2014 | Passot | G06N 3/008 |
| | | | 700/257 |

\* cited by examiner

MAPPING ACTIONS AND OBJECTS TO TASKS

BACKGROUND

A growing number of users are using smart devices, such as smart phones, tablet computers, and so on, to interact with virtual assistants. The users may communicate with virtual assistants to perform a desired task, such as searching for content, checking into a flight, setting a calendar appointment, and so on. As the users provide input, the virtual assistants often incorrectly determine a task that the users are requesting. Accordingly, there is an increasing need to accurately identify a task to be performed by the virtual assistant for a user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
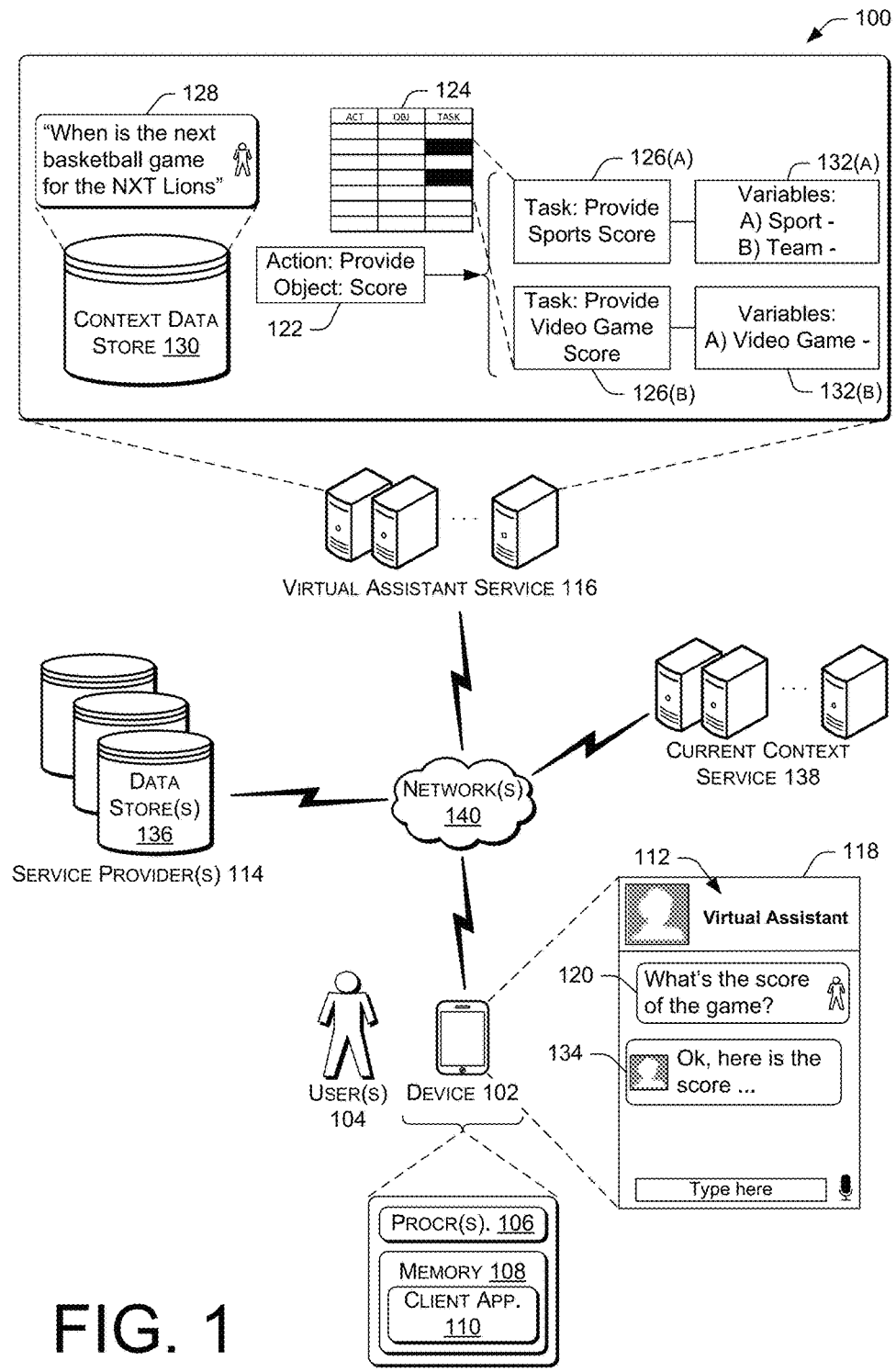
FIG. 1 illustrates an example architecture in which techniques described herein may be implemented.

This disclosure describes, in part, techniques for mapping actions and objects to tasks of a virtual assistant. In some instances, a user may interact with a virtual assistant on a smart device by providing input to the virtual assistant and/or receiving information from the virtual assistant. While interacting with the virtual assistant, the user may provide input that requests or otherwise facilitates a task to be performed by the virtual assistant. The virtual assistant may process the input to determine an action (e.g., verb) and an object (e.g., noun). For example, if the user inputs "listen to music," the virtual assistant may identify the term "listen" as corresponding to the action and the term "music" as corresponding to the object.

The virtual assistant may then identify a task to be performed by the virtual assistant. In some instances, the virtual assistant may reference a task map. The task map may map action-object pairs to tasks of the virtual assistant. A task may include any type of operation that is performed at least in part by a computing device. In returning to the example above, the virtual assistant may determine that the action of "listen" and the object of "music" are associated with a task of playing a song on the smart device. The virtual assistant may then perform the identified task (e.g., play the song). By utilizing a task map or other source of correlation that maps action-object pairs to tasks, a task may be efficiently identified for performance by the virtual assistant.

In some instances, the virtual assistant may utilize contextual information to identify a task to be performed by the virtual assistant. The contextual information may include a conversation history of the user with the virtual assistant, content output history identifying content that has been output to the user, user preferences, location of the user, and so on. The contextual information may provide some indication of what task the user would like the virtual assistant to perform (e.g., what the user is requesting the virtual assistant to do). For example, if a user has discussed a flight in a recent conversation with the virtual assistant, and the user has just input "please provide a status," which may map to multiple tasks (e.g., provide a flight status, provide a shipping status of a purchased item, provide a battery or download status, etc.), the virtual assistant may reference the recent conversation to infer that the user may be interested in flight status information. By referencing contextual information, the virtual assistant may identify a task that is relevant to the user's context.

This disclosure also describes techniques for customizing a task map of a virtual assistant. In some instances, the task map may be personalized for a particular user (e.g., on a user-by-user basis). Here, the virtual assistant may learn what task to perform for a particular action-object pair of input from the user. For example, if the virtual assistant has identified input of "let's rock-out" from the user in a previous conversation as corresponding to a task of playing music, the virtual assistant may update the task map for that user such that an action-object pair for "let's rock-out" corresponds to the task of playing music. In another example, the virtual assistant may learn the types of content that are output to a user, and personalize tasks to those types of content. To illustrate, if a user frequently views sports content on a particular sports web site, the task map may be personalized so that an action-object pair associated with sports may be associated with a task of navigating to the particular sports web site.

Alternatively, or additionally, a task map may be customized for a particular industry application, platform, device type, and so on, in which the virtual assistant is to be deployed. To illustrate, a task map may be generated for an airline industry implementation so that action-object pairs that are relevant to the airlines are associated with tasks that are relevant to the airlines. In this illustration, an action-object pair of check-status may be associated with a task of checking the status of an airline flight, instead of a task of checking the status of a purchased item, which may be the case in another industry application, such as an e-commerce implementation.

By customizing a task map for a particular context, a virtual assistant may perform tasks that are relevant to the particular context. In one example, by personalizing the task map for a particular user, the virtual assistant may provide a personalized interaction with the user (e.g., a conversation that is adapted to the user). In another example, by customizing a task map for a particular industry application, the virtual assistant may provide functionality that is adapted to the particular industry application. Further, by customizing a task map based on a context for which the virtual assistant is to be utilized, the virtual assistant may provide accurate task determination, which may enhance a user's experience with the virtual assistant. Moreover, the techniques described herein may learn over time tasks that may be relevant to particular action-object pairs and evolve a task map based on the learning.

This brief introduction is provided for the reader's convenience and is not intended to limit the scope of the claims, nor the proceeding sections. Furthermore, the techniques described in detail below may be implemented in a number of ways and in a number of contexts. Example implementations and contexts are provided with reference to the following figures, as described below in more detail. It is to be appreciated, however, that the following implementations and contexts are but some of many.

Example Architecture

FIG. 1 illustrates an example architecture 100 in which techniques described herein may be implemented. The architecture 100 includes a smart device 102 configured to interact with one or more users 104 (hereinafter the user 104) and perform other processing discussed herein. The smart device 102 may comprise any type of computing device that is configured to perform an operation. For example, the smart device 102 may be implemented as a laptop computer, a desktop computer, a server, a smart phone, an electronic reader device, a mobile handset, a personal digital assistant (PDA), a portable navigation device, a portable gaming device, a tablet computer, a watch, a portable media player, a television, a set-top box, a computer system in a car, an appliance, a camera, a robot, a hologram system, a security system, a home-based computer system (e.g., intercom system, home media system, etc.), a projector, an automated teller machine (ATM), a pair of glass with computing capabilities, a wearable computer, and so on.

The smart device 102 may be equipped with one or more processors 106, memory 108, a display(s), a microphone(s), a speaker(s), a camera(s), a sensor(s), and a network interface(s). The one or more processors 106 may include a central processing unit (CPU), a graphics processing unit (GPU), a microprocessor, a digital signal processor, and so on. The sensor(s) may include an accelerometer, compass, gyroscope, magnetometer, Global Positioning System (GPS), olfactory sensor (e.g., for smell), or other sensor. In some instances, the display(s) is implemented as one or more touch screens. The camera(s) may include a front facing camera and/or a rear facing camera. The display(s), microphone(s), speaker(s), camera(s), and/or sensor(s) may be configured to receive user input, such as gesture input (e.g., through the camera), touch input, audio or speech input, and so on, and/or may be configured to output content, such as audio, images, video, and so on.

The memory 108 may include a client application 110 (e.g., module) configured to interface with the user 104. The client application 110 may receive any type of input from the user 104, such as audio or speech, text, touch, or gesture input received through a sensor or other element of the smart device 102. The client application 110 may also provide any type of response, such as audio, text, interface items (e.g., icons, buttons, menu elements, etc.), and so on. In some implementations, the client application 110 is implemented as, or in association with, a mobile application, a browser (e.g., mobile browser), and so on.

The client application 110 may be implemented as, or in conjunction with, a virtual assistant 112 (e.g., an intelligent personal assistant). A "virtual assistant" may act as an interface between end users and information of one or more service providers 114 (hereinafter the service provider 114), information of the smart device 102, information of a virtual assistant service 116, or any type of information. For example, in response to input from the user 104, the virtual assistant 112 may access content items stored on the service provider 114 to formulate a response to the user 104. The virtual assistant 112 may be configured for multi-modal input/output (e.g., receive and/or respond in audio or speech, text, touch, gesture, etc.), multi-language communication (e.g., receive and/or respond according to any type of human language), multi-channel communication (e.g., carry out conversations through a variety of computing devices, such as continuing a conversation as a user transitions from using one computing device to another), and other types of input/ output or communication. In some instances, the virtual assistant 112 may embody a human-like persona and/or artificial intelligence (AI). For example, the virtual assistant 112 may be represented by an image or avatar that is displayed on the smart device 102. An avatar may comprise an animated character that may take on any number of shapes and appearances, and/or resemble a human talking to a user. In some instances, the avatar may be arranged as a representative of the service provider 114, while in other instances the avatar may be a dedicated personal assistant to a user.

The virtual assistant 112 may interface with the user through a conversation user interface 118. The conversation user interface 118 may provide conversation items representing information from the virtual assistant 112 and/or information from the user 104. For example, in response to a query from the user 104 to "find the nearest restaurant," the conversation user interface 118 may display a dialog representation of the user's query and a response item of the virtual assistant 112 that identifies the nearest restaurant to the user 104. A conversation item may comprise an icon (e.g., selectable or non-selectable), a menu item (e.g., drop down menu, radio control, etc.), text, a link, audio, video, or any other type of information. In addition to conversation items, the conversation user interface 118 may include other interface items, such as a microphone icon for speech input, a text box to input text, a keyboard (e.g., touch screen keyboard), other input icons, and so on.

Although the conversation user interface 118 has been described as being associated with the smart device 102, in other examples the conversation user interface 118 is associated with the service provider 114 and/or the virtual assistant service 116. In one instance, the interface 118 is displayed through an online site of the service provider 114, such as when the user navigates to the online site. Here, the interface 118 may include a virtual assistant that embodies characteristics of the service provider 114, such as a flight attendant for an online airline site.

The user 104 may generally interact with the virtual assistant 112 to cause a task to be performed by the virtual assistant 112. In some instances, a task may be performed in response to explicit user input, such as playing music in response to "please play music." While in other instances a task may be performed in response to inferred user input requesting that that the task be performed, such as providing weather information in response to "the weather looks nice today." In yet further instances, a task may be performed when an event has occurred, such as providing flight information an hour before a flight.

A task may include any type of operation that is performed at least in part by a computing device. For example, a task may include logging a user into a site, setting a calendar appointment, resetting a password for a user, purchasing an item, opening an application, sending an instruction to a device to perform an act, sending an email, outputting content (e.g., outputting audio (an audible answer), video, an image, text, a hyperlink, etc.), navigating to a web site, upgrading a user's seat assignment, and so on. In some instances, a task may include providing a response to a user. The response may be addressed to or otherwise tailored to the user (e.g., "Yes, John, as a Gold Customer you are entitled to a seat upgrade, and I have provided some links below that may be of interest to you . . . "). Further, in some instances a task may include performing an operation according to one or more criteria (e.g., one or more default settings). To illustrate, a task may include sending an email through a particular email account, providing directions with a particular mobile application, searching for content through a particular search engine, and so on. Alternatively, or additionally, a task may include providing information through the conversation user interface 118.

A task may be associated with variables for performing the task. For example, a task of playing music may be associated with an artist variable indicating the artist and a song variable indicating the song. In some instances, a value for a variable is obtained from the input that initiated the task. For example, if the user requests "please play Free Fallin' by Tom Petty," the virtual assistant 112 may identify "Free Fallin'" as a value for the song variable and "Tom Petty" as a value for the artist variable. In other instances, values for variables may be known and/or obtained from contextual information. For example, if a user requests "please text Megan," the virtual assistant 112 may identify a particular Megan in the user's contacts (e.g., when the contacts include multiple Megans) that was recently texted as a value for the person ID variable for the task. Alternatively, or additionally, a value for a variable may be obtained by prompting a user for the value. For example, if the user requests "book a flight," and has not provided a destination, the virtual assistant 112 may ask the user "where would you like to fly to?" and the user may provide a destination as the value.

The virtual assistant 112 may generally determine a task to perform by referencing one or more task maps. A task map may map action-object pairs to tasks. A task map may generally refer to any type of data that associates a task with an action-object pair. For example, a task map may comprise a look-up table, data in a database, data of a state machine, or any other data to correlate tasks and action-object pairs. As used herein, an action may comprise a verb, while an object may comprise a noun. In some examples, a task map may specify associations for a particular type of noun, such as a common noun (e.g., a class of entities) or a proper noun (e.g., a unique entity). If, for example, a task map includes an object that corresponds to a common noun, the variable value for the task may specify the proper noun. To illustrate, if a task map includes an object that corresponds to a common noun and a user requests "please play Free Fallin'," the object may comprise a song (e.g., the common noun) while the variable value may comprise "Free Fallin'" (e.g., the proper noun).

In many instances, the virtual assistant 112 operates in cooperation with the virtual assistant service 116. That is, one or more functions of the virtual assistant 112 may be performed by the virtual assistant service 116. The virtual assistant service 116 may generally provide one or more services, such as input processing, speech recognition, response formulation, task mapping, context analysis, user characteristic analysis, and so on. The virtual assistant service 116 may generally act as a "back-end" resource for the smart device 102.

In one illustrative example of the operations performed by the virtual assistant service 116, the smart device 102 may receive input 120 from the user 104 (e.g., "what's the score of the game?") and send the input 120 to the virtual assistant service 116 for processing. The virtual assistant service 116 may analyze the input 120 to determine an action and an object 122. Here, the action comprises "provide," while the object comprises "score." The virtual assistant service 116 may then reference a task map 124 that associates action-object pairs with tasks. In this example, the action-object pair of provide-score maps to multiple tasks, namely a task 126(*a*) of providing the score of a sports game and a task 126(*b*) of providing the score of a video game. In one instance, in order to identify the particular task to be performed, the virtual assistant service 116 may reference contextual information 128 stored in a context data store 130 and rank the tasks 126 based on which task is most relevant to the contextual information 128. Here, the user 104 had a conversation with the virtual assistant 112 yesterday about the NXT Lions basketball team. Based on this information, the virtual assistant service 116 may identify that the task 126(*a*) of providing a score of a sports game as most relevant to the input 120. In other instances, the virtual assistant service 116 may prompt the user for further clarification regarding a task (e.g., "would you like to view the score of the sports game or view the score of the video game?").

The virtual assistant service 116 may then determine variable values 132(*a*) for performing the task 126(*a*). As illustrated in FIG. 1, the tasks 126 may be associated with variables 132 for performing the tasks 126. In this example, the virtual assistant service 116 again references the contextual information 128 to identify a value for the sport and team variables (e.g., basketball and NXT Lions) of the task 126(*a*). However, in other examples the virtual assistant 116 may cause the virtual assistant 112 to prompt the user 104 for the variable values 132(*a*). Upon identifying the variable values 132(*a*), the virtual assistant service 116 may cause the score of the game to be provided to the user 104, as illustrated at 134.

In the example above, a task was identified based on contextual information that provided content of a previous conversation. However, in other examples, other types of contextual information may be used. In one example, a task may be identified based on contextual information that indicates a type of device a user is using to interact with a virtual assistant. If, for instance, the user requests "call Michelle," and the user is using a desktop computer, a task for that context may be identified, such as calling an individual through a voice over internet protocol service or setting a reminder to call the individual at a later time (e.g., when the user is on his cell phone). Whereas, if the user is using a cell phone, a different task may be identified, such as calling the individual through a cellular connection.

In some instances, contextual information may be used to identify an order to perform multiple tasks. To illustrate, if it is determined that the user would like to buy tickets to a movie and call his girlfriend, the task for buying the movie tickets may be performed first based on a calendar event for a date with the user's girlfriend (e.g., indicating that the user may want to buy the tickets first so that he can mention the tickets to his girlfriend). Thereafter, the task for calling the user's girlfriend may be performed.

The architecture 100 also includes the service provider 114 that includes one or more data stores 136 for storing content items. The one or more data stores 136 may include a mobile web data store, a smart web data store, an information and content data store, a content management service (CMS) data store, and so on. A mobile web data store may store content items that are designed to be viewed on a mobile device, such as a mobile telephone, tablet device, etc. Meanwhile, a web data store includes content items that are generally designed to be viewed on a device that includes a relatively large display, such as a desktop computer. An information and content data store may include content items associated with an application, content items from a data base, and so on. A CMS data store may include content items providing information about a user, such as a user preference, user profile information, information identifying offers that are configured to a user based on profile and purchase preferences, etc. As such, the service provider 114 may include content items from any type of source. Although the one or more data stores 136 are illustrated as included in the service provider 114, the one or more data stores 136 may alternatively, or additionally, be included in the virtual assistant service 116 and/or the smart device 102.

As illustrated, the architecture 100 may include a current context service 138 to provide current information about a context. For example, the current context service 138 may provide information about current events (e.g., news articles, sports scores, blog content, social media content, a current flight status (e.g., on-time, delayed, etc.), and so on), location information about a user (e.g., a user's current location), current weather information, current times and/or dates (e.g., a current time in Japan, a current time in the US, a current time and date where a user is located, etc.), and so on. In some instances, this information is stored at the current context service 138, while in other instances the information is sent to the service provider 114, the virtual assistant service 116, and/or the smart device 102 for storage. The current context service 138 may communicate with the virtual assistant service 116 to provide information that may be useful to the virtual assistant 112.

The architecture 100 may also include one or more networks 140 to enable the smart device 102, the virtual assistant service 116, the service provider 114, and/or the current context service 138 to communicate with each other. The one or more networks 140 may include any one or combination of multiple different types of networks, such as cellular networks, wireless networks, Local Area Networks (LANs), Wide Area Networks (WANs), the Internet, and so on.

Example Virtual Assistant Service

Figure 2:
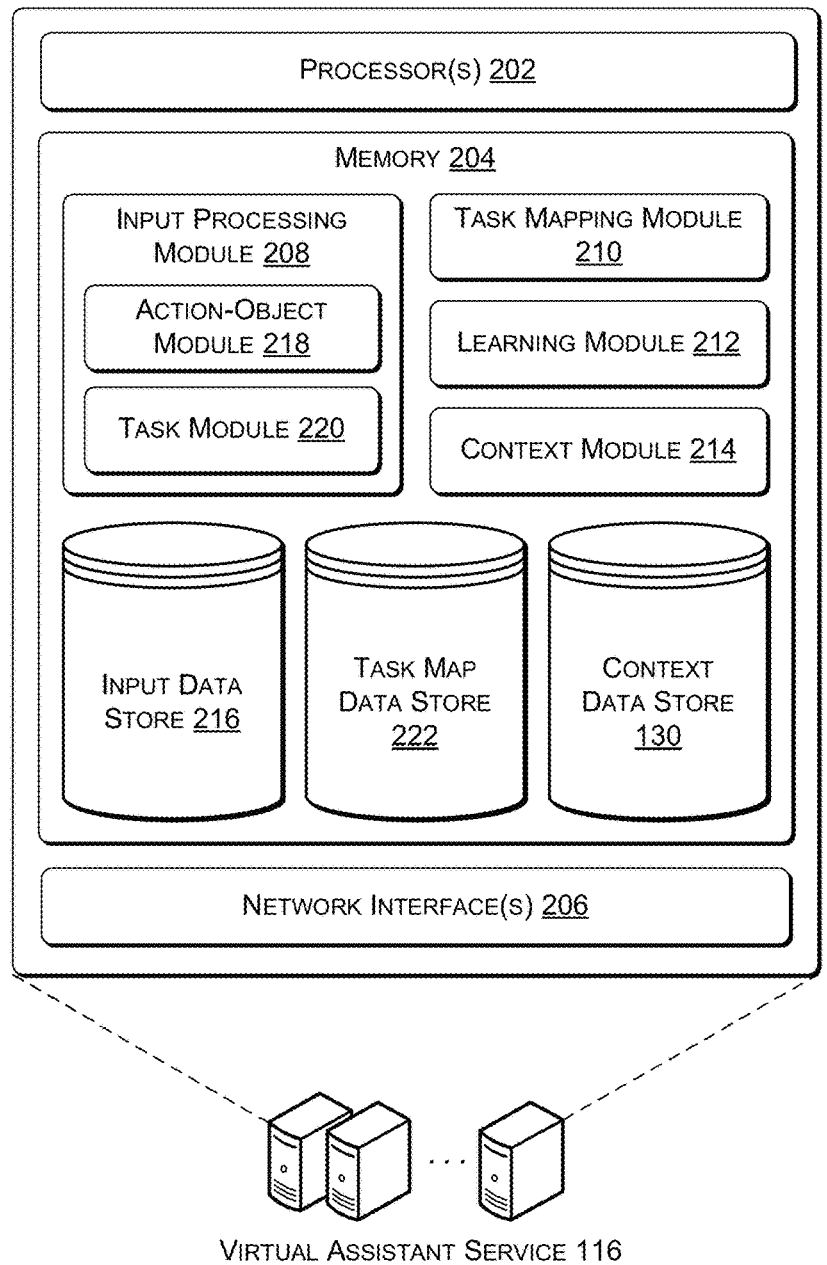
FIG. 2 illustrates details of an example virtual assistant service.

FIG. 2 illustrates further details of the example virtual assistant service 116 of FIG. 1. As noted above, the virtual assistant service 116 may generally provide one or more services to implement the virtual assistant 112 on the smart device 102.

As illustrated, the virtual assistant service 116 may include one or more computing devices. The one or more computing devices may be implemented as one or more desktop computers, laptop computers, servers, and the like. The one or more computing devices may be configured in a cluster, data center, cloud computing environment, or a combination thereof. In one example, the virtual assistant service 116 provides cloud computing resources, including computational resources, storage resources, and the like, that operate remotely to the smart device 102.

The one or more computing devices of the virtual assistant service 116 may include one or more processors 202, memory 204, and one or more network interfaces 206. The one or more processors 202 may include a central processing unit (CPU), a graphics processing unit (GPU), a microprocessor, a digital signal processor, and so on. The memory 204 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. As illustrated in FIG. 1, the memory 204 includes an input processing module 208, a task mapping module 210, a learning module 212, and a context module 214.

The input processing module 208 may be configured to obtain and/or process input received from a user. If, for example, the input is speech input, the input processing module 208 may perform speech recognition techniques to convert the input into a format that is understandable by a computing device, such as text. The input processing module 208 may store input in an input data store 216. The input processing module 208 may also be configured to determine a task to perform. To make such a determination, the input processing module 208 may include an action-object module 218 and a task module 220.

The action-object module 218 may determine (e.g., identify) an action and/or an object for user input. An action and/or object may be explicitly included in user input, inferred from the structure and/or context of the user input, and/or obtained by prompting a user (e.g., if missing information or context). The action-object module 218 may utilize various techniques, such as Part-of-Speech Tagging (POST), probabilistic or statistical speech modeling, Natural Language Processing (NLP), pattern recognition language modeling, and so on. These techniques may seek to interpret or derive a meaning and/or concept of input and may include new and/or existing techniques. In some instances, an action and/or object may be associated with a confidence score indicating an estimated level of accuracy that the action or object was correctly identified.

The task module 220 may determine (e.g., identify) a task to be performed based on an action, object, and/or variable value of user input. The task module 220 may reference one or more task maps stored in a task map data store 222. In one example, the task module 220 may identify matching information in a task map (e.g., all information in the map that includes a determined action, object, and/or variable value) and tasks that are associated with the matching information. In other words, the task module 220 may identify all candidate tasks in a task map that are associated with an action, object, and/or variable value that are identified from user input (e.g., all rows of table-based task map that include an identified action, object, or variable value). Each candidate task may be associated with a confidence score that is based on the confidence scores of the associated action and/or object for the task. The task module 220 may then determine whether or not any of the candidate tasks satisfy one or more criteria, such as being the only task that is associated with identified information in the task map and/or being associated with a confidence score that is greater than a threshold. When such criteria are satisfied, the task may be selected. Alternatively, if the criteria are not satisfied, then the virtual assistant service 116 may identify a task to be performed by prompting the user for information and/or ranking the candidate tasks.

In some instances, the task module 220 may make an initial determination as to a context in which user input is received and reference a task map that is customized for the context. The context may comprise a particular industry (e.g., field of use), platform (e.g., type of software/hardware architecture—mobile operating system, desktop operating system, etc.), device or device type, user, user type, location (e.g., user location), and so on. To illustrate, when a user is using a cell phone to interact with the virtual assistant 112, the task module 220 may reference a task map that is customized for a mobile platform, whereas when the user is using a laptop, the task module 220 may reference a task map that is customized for a laptop platform. In another illustration, the task module 220 may reference a task map that is personalized for a user, when the user is interacting with the virtual assistant 112. Here, the user may be identified through voice recognition, device identification information, etc. As such, the virtual assistant service 116 may utilize different task maps for different contexts.

The task module 218 may additionally, or alternatively, determine variable values for variables that are associated with a task. A variable value may generally relate to any type of information that may be useful for performance of a task. A variable value may be obtained from user input, contextual information, and so on. A variable of an associated variable value may include, for example:

- media variables for outputting media, such as a song or movie title, an artist name, lyrics to a song, an album name, and so on;
- message variables for creating, viewing, and/or otherwise interacting with messages (e.g., emails, text messages, telephone calls, etc.), such as an email address, telephone number, content of a message, a subject line, an attachment (e.g., information identifying an attachment), and so on;
- navigation variables for directions, such as a destination location, a starting location, a route, a travel mode (e.g., by road, foot, or bike), etc.;
- travel variables, such as a flight number, a confirmation number, an airlines, a number of bags to check, a number of passengers, and so on;
- purchase variables for purchasing an item, such as item identification information, a type of item (e.g., a shoe, a bike, etc.), a shipping address, an account to charge, a type of shipment, etc.;
- calendar variables to set, view, or update a calendar event, such as a time of day for the event, a location of the event, a date for the event, an individual to be involved in the event, and so on;
- social media variables for posting and/or viewing information of a social networking service, such as content to post to a social networking site (e.g., information identifying an image or video of a user), a name of the social networking service, etc.;
- reminder variables to set and/or view a reminder, such as a time for a reminder, a date for a reminder, a type of alarm to be triggered (e.g., a ringer type), etc.;
- application variables identify an application to use for a task, such as user input requesting "provide directions via Google® maps," "send an email via my Yahoo® account," "find movie reviews with Fandango®," "find a review through Yelp®," and so on;
- a source of content variable to identify a content source for performing a task, such as user input requesting "find information about the basketball game on the web," "look at my contact list on my phone to find Jane," "search Google® for a new car," and so on; or any other type of variable.

The task module 220 may also cause a task to be performed by the virtual assistant 112. This may include performing the task at the virtual assistant service 116 and/or sending an instruction to another device (e.g., the smart device 102) to perform the task. To illustrate, in response to input of "what is the weather like today?," the task module 220 may send an instruction to the smart device 102 to retrieve weather information and output the information to the user 104. In another illustration, in response to "please change my password to Hawaii39," the virtual assistant service 116 may reference information of the user to change the password. The virtual assistant service 116 may then cause a response to be output indicating that the password has been changed (e.g., "your password has been changed to Hawaii39").

The task mapping module 210 may configure one or more task maps. This may generally include associating an action, object, and/or variable value with a task. The task mapping module 210 may generate and/or customize a task map for a particular context, such as a particular industry, platform, device type, user, user type, location, and so on. In one example, a task map may be personalized for a particular user based on contextual information related to that user. To illustrate, if the virtual assistant service 116 learns over time that a user inputs "send a message" to initiate a task of sending an email, in contrast to sending a text message, the task mapping module 210 may associate "send a message" (e.g., the action-object of the phrase) with the task of sending an email.

The learning module 212 may learn information to be associated with a task, such as an action, object, and/or variable value. To do so, the learning module 212 may generally analyze contextual information related to a user or conversation. To illustrate, assume that the user states "let's jam" in an effort to listen to music and the virtual assistant service 116 incorrectly interprets this input as corresponding to a different task (e.g., searching for fruit jam on the internet), which is then performed and a response is sent to the user. Here, the user may have ignored the response of the virtual assistant 112 (e.g., closed a browser window) and opened a music application to listen to music. In this illustration the learning module 212 may learn that the particular action-object pair for "let's jam" is to be associated with the task of playing music.

The learning module 212 may also observe user activity and attempt to learn characteristics about a user. The learning module 212 may learn any number of characteristics about the user over time, such as user preferences (e.g., likes and dislikes), track patterns (e.g., user normally reads the news starting with the sports, followed by the business section, followed by the world news), behaviors (e.g., listens to music in the morning and watches movies at night, speaks with an accent that might impact language models, prefers own music collection rather than looking for new music in the cloud, etc.), and so on. To observe user activity and learn a characteristic, the learning module 212 may access a user profile, track a pattern, monitor navigation of the user, monitor content that is output to the user, and so on. Each of these learned characteristics may be useful to provide context that may be utilized to interpret user input and/or to identify a task.

As an example of learning a characteristic, consider a scenario where a user incorrectly inputs "Cobo" or a speech recognition system incorrectly recognized the user input as "Cobo". Once the user corrects this to say "Cabo", the learning module 212 can record this correction from "Cobo" to "Cabo" in the event that a similar situation arises in the future. Thus, when the user next speaks the phrase "Cabo San Lucas," and even though the speech recognition might recognize the user input as "Cobo," the virtual assistant service 116 may use the learned correction and make a new assumption that the user means "Cabo" and respond accordingly. As another example, if a user routinely asks for the movie "Crazy," the learning module 212 will learn over time that this is the user preference and make this assumption. Hence, in the future, when the user says "Play Crazy," the virtual assistant service 116 will make a different initial assumption to begin play of the movie, rather than the original assumption of the song "Crazy" by Willie Nelson.

The context module 214 may be configured to identify (e.g., determine) one or more pieces of contextual information. Contextual information may be used to identify and/or weight an action, object, variable value, and/or task. For example, for input of "I want to buy a new coat," the virtual assistant service 116 may reference a recent conversation in which the user requested directions to a clothing store to purchase a coat. Based on this conversation, it may be determined that the user is more interested in purchasing the coat at the store (e.g., a task of creating a reminder to purchase the coat upon arrival at the store), rather than purchasing the coat through a phone (e.g., a task of navigating to an online e-commerce site). In addition, contextual information may be utilized when providing a response to a user and/or when no query has been received (e.g., providing relevant information to a user upon arrival at a particular location). In some examples, contextual information may be weighted toward providing more or less impact than other contextual information. By taking context into account, a more accurate task may be identified, in comparison to traditional techniques.

Generally, contextual information may comprise any type of information that aids the virtual assistant 112 in interacting with a user (e.g., understanding the meaning of a query of a user, formulating a response, determining a task to be performed, etc.). In some instances, contextual information is expressed as a value of one or more variables, such as whether or not a user has signed in with a site (e.g., "is_signed_in=true" or "is_signed_in=false"). Contextual information may be stored in the context data store 130. Example, non-limiting pieces of contextual information may include:

- conversation history between a user and a virtual assistant, either during a current session(s) or during a previous session(s) (e.g., input and/or output information), the conversation history may indicate terms and/or phrases that are frequently used (e.g., more than a particular number of times);
- content output history that identifies content that has been output to the user (e.g., movies that have been viewed, songs that have been listened to, web sites that have been viewed, pictures that have been viewed, etc.);
- what type of content the user prefers to view or listen to (e.g., the user frequently views sports content);
- navigation history indicating content that has been navigated to by a user, in some instances the navigation history may indicate content that is navigated to for performing a task (e.g., the virtual assistant 112 provides a sports web site in response to "what happened at the game last night?," and the user navigates on the sports web site to a particular college basketball team);
- information identifying a content source that is accessed by a user, in some instances the information may indicate a content source that is accessed during a conversation (e.g., the virtual assistant 112 opens a sports app in response to "what happened at the game last night?," and the user disregards the app and accesses a web site to view sports information), the content source may comprise a web source, an application, local storage, remote storage (e.g., cloud source), etc.;
- input mode history indicating one or more input modes that a user has used to interact with a user interface;
- what type of input mode the user prefers to interact with a virtual assistant (e.g., input mode—whether the user prefers to submit a query textually, using voice input, touch input, gesture input, etc.), the preferred input mode may be inferred from previous interactions, explicit input of the user, profile information, etc.;
- device information indicating a type of device that is used by a user to interact with a virtual assistant (e.g., a mobile device, a desktop computer, game system, etc.);
- a user preference indicating a preference of a user (e.g., a seat preference, a home airport, a preference of whether schedule or price is important to a user, a type of weather a user enjoys, types of items acquired by a user and identifying information for those items, types of stock a user owns or sold, etc.);
- calendar information describing one or more events of a user (e.g., a scheduled flight, a work meeting, etc.);
- a location of a cursor on a site when a user provides input to a virtual assistant;
- a time of day or date on which a user provides input to a virtual assistant;
- a current time of day;
- an age or gender of a user;
- a location of a user (e.g., a geo-location of the user associated with a device through which the user provides a query, location based on network information, address of the user, etc.);
- sensor information obtained from a sensor of a device with which a user is interacting (e.g., a geo-location, environmental data including background noise or video/audio from a surrounding of the device, etc.);
- an orientation of a device which a user is using to interact with a virtual assistant (e.g., landscape or portrait);
- a communication channel which a device of a user uses to interface with the virtual assistant service (e.g., wireless network (e.g., Wi-Fi®), wired network, cellular network, etc.);
- information indicating whether a communication channel is secured or non-secured (e.g., public network communications vs. private network communications);
- a language associated with a user (e.g., a language of a query submitted by the user);
- how an interaction with a virtual assistant is initiated (e.g., via user selection of a link or graphic, via the virtual assistant proactively engaging a user, etc.);
- how a user has been communicating recently (e.g., via text messaging, via email, etc.);
- information derived from a user's location (e.g., current, forecasted, or past weather at a location, major sports teams at the location, nearby restaurants, etc.);
- current topics of interest, either to a user or generally (e.g., trending micro-blog or blog topics, current news, recent micro-blog or blog posts made by the user, etc.);
- whether or not a user has signed-in with a site of a service provider (e.g., with a user name and password);
- a status of a user with a service provider (e.g., based on miles flown, a type of membership of the user, a type of subscription purchased by the user, etc.);
- a page of a site from which a user provides a query to a virtual assistant;
- how long a user has remained on a page of a site from which the user provides a query to the virtual assistant;
- social media information (e.g., posts or other content posted to a social networking site or blog);

user profile information (e.g., information identifying friends/family of a user, information identifying where a user works or lives, information identifying a car a user owns, etc.);

a characteristic of a user; or any other type of information.

Although the modules 208-214 are illustrated as being included in the virtual assistant service 116, in some instances one or more of these modules may be included in the smart device 102 or elsewhere. As such, in some examples the virtual assistant service 116 may be eliminated entirely, such as in the case when all processing is performed locally at the smart device 102 (e.g., the smart device 102 operates independently).

While various operations are described as being performed by modules, any of these operations, and/or other techniques described herein, may be implemented as one or more hardware logic components, such as Field-Programmable Gate Arrays (FPGAs), Application-Specific Integrated Circuits (ASICs), System-on-a-chip systems (SOCs), Complex Programmable Logic Devices (CPLDs), etc.

The memory 108 and/or 204 (as well as all other memory described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media is non-transitory media.

Example Task Mapping

Figure 3:
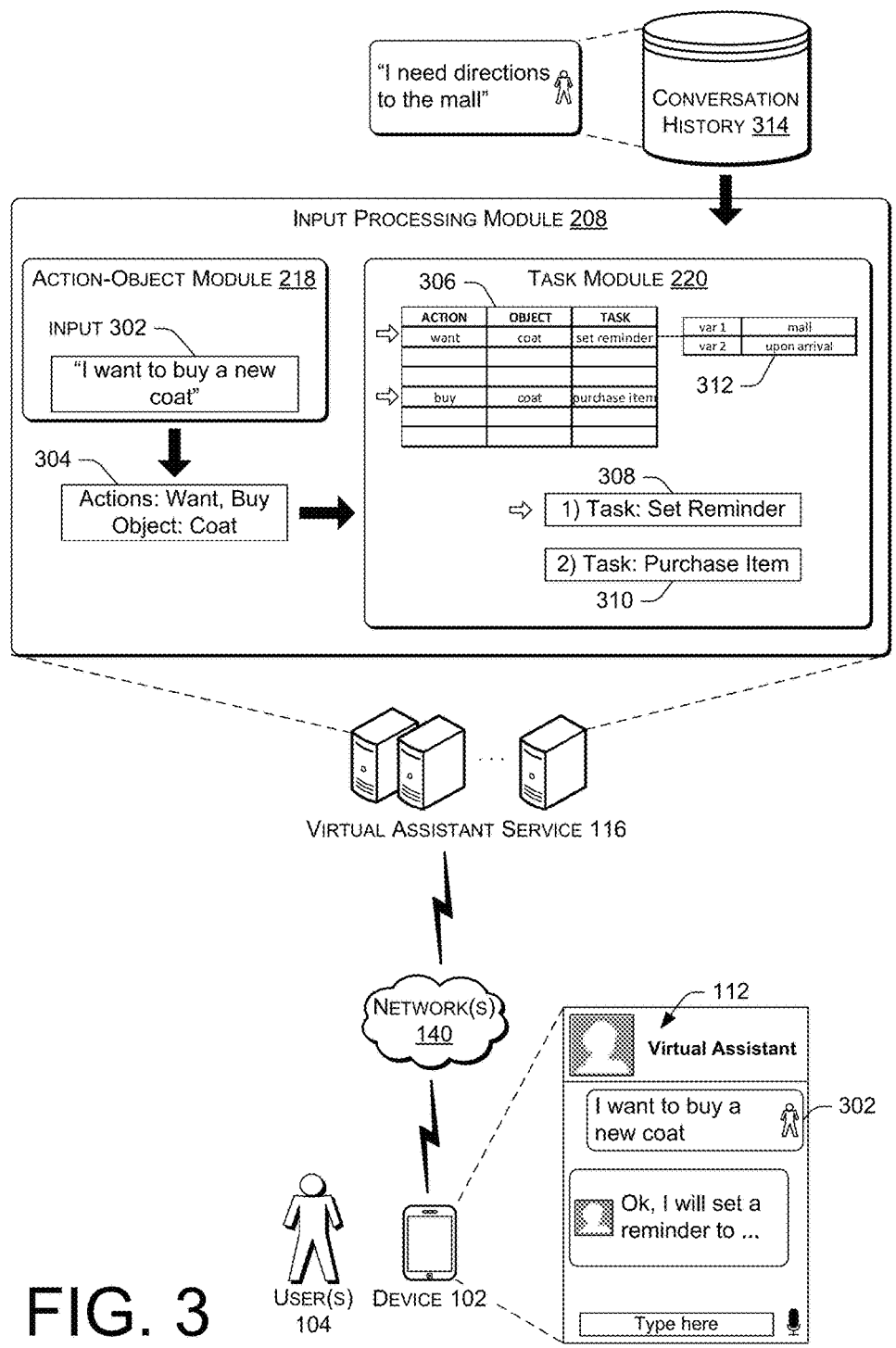
FIG. 3 illustrates an example process to determine a task to be performed by a virtual assistant.

FIG. 3 illustrates an example process to determine a task to be performed by the virtual assistant 112. In this example, the user 104 has provided input 302 "I want to buy a new coat," which has been sent to the virtual assistant service 116 for processing. At the virtual assistant service 116, the action-object module 218 may determine actions and objects 304 for the input 302 (actions—want, buy; object—coat). The actions and objects 304 may each be associated with a confidence score indicating an estimated level of accuracy that the action or object was correctly identified. The actions and objects 304 may be passed to the task module 220.

The task module 220 may identify information in a task map 306 that matches the actions and objects 304. In this example where the task map 306 is represented as a table, the task module 220 may identify all rows in the task map 306 that include an action or an object of the determined actions and object 304. Here, two rows have been identified, a row associated with a task 308 of setting a reminder and a row associated with a task 310 of purchasing an item. In this example, in order to select a task for performance, the task module 220 ranks the tasks 308 and 310 and selects a task that ranks the highest, namely the task 308. The ranking may be based on confidence scores of the tasks 308 and 310, which are based on the confidence scores of the associated actions and objects. The confidence scores of the actions and/or objects may be assigned by the action-object module 218. In other examples, a task may be selected by asking the user 104 what task the user is requesting. As illustrated in FIG. 3, the task 308 ranks the highest and, as such, is selected for performance.

The task module 220 may also identify values for variables 312 that are associated with the task 308 by analyzing the input 302 and/or contextual information. In this example, the task module 220 references conversation history 314 that indicates that the user 104 recently requested directions to the mall (e.g., in a conversation early that morning). Based on this conversation, the task module 220 may determine a value for a destination variable for triggering a reminder (e.g., the mall) and a value for when to trigger the reminder (e.g., upon arrival). The virtual assistant service 116 may then perform the task 308 of setting a reminder based on the values for the variables 312. Although in this example the values for the variables 312 are identified upon determining a task to be performed, in other examples the values may be identified when the input 302 is processed and/or at other times.

Example User Interface

Figure 4:
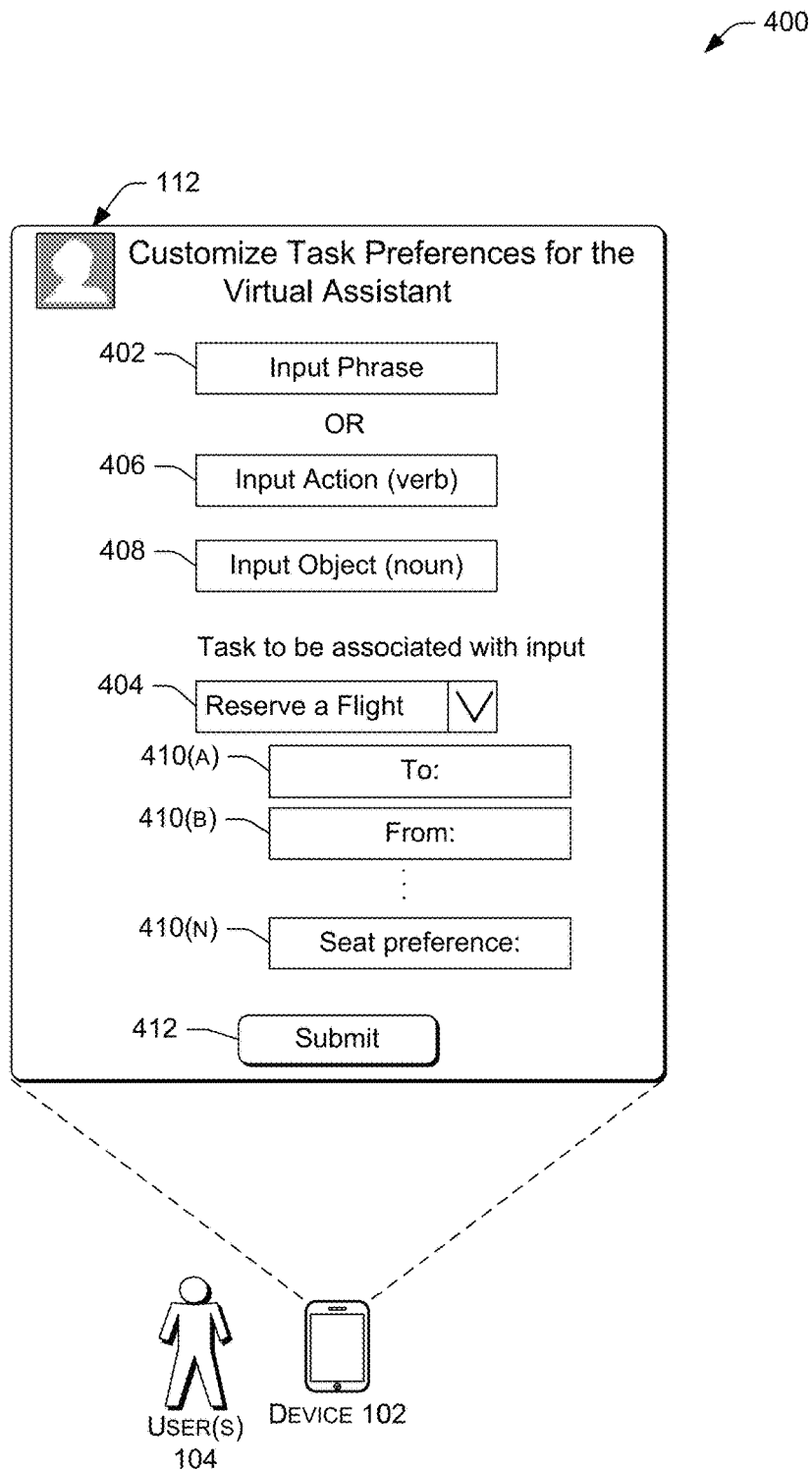
FIG. 4 illustrates an example user interface to enable a user to customize task preferences of a virtual assistant.

FIG. 4 illustrates an example user interface 400 to enable a user to customize task preferences of the virtual assistant 112. As illustrated, the interface 400 may be provided through the smart device 102 to enable the user 104 to configure information related to a task. Although the interface 400 may also be presented through other devices.

Through an input field 402, the user 104 may input a phrase, such as "book it," to be associated with a task selected through a drop down menu 404, such as a task of reserving a flight. Alternatively, or additionally, the user 104 may input an action (e.g., verb) into an input field 406 and/or may input an object (e.g., noun) into an input field 408 to be associated with the selected task. Through input fields 410(a)-410(n) the user 104 may input variable values to be associated with the task that is selected through the drop down menu 404. For example, the user 104 may specify a window seat as a seat preference for the seat preference variable. Based on this seat preference, the virtual assistant 112 may seek to find a window seat for the user 104 when reserving a flight. The user 104 may select a submit button 412 to configure the virtual assistant 112 according to the specified information (e.g., associate the information with the task of reserving a flight). By doing so, a user may customize the virtual assistant 112 to operate in a personalized manner (e.g., customize a task map of the virtual assistant 112). For example, the virtual assistant 112 may be customized so that the phrase "book it" corresponds to the task of reserving a flight.

Although not illustrated in FIG. 4, in some instances the interface 400 may enable the user 104 to specify custom tasks to be performed by the virtual assistant 112. For example, the user 104 may specify a custom task of vibrating in response to "shake it." This may further allow the user 104 to customize a task map of the virtual assistant 112.

Example Processes

Figure 5A:
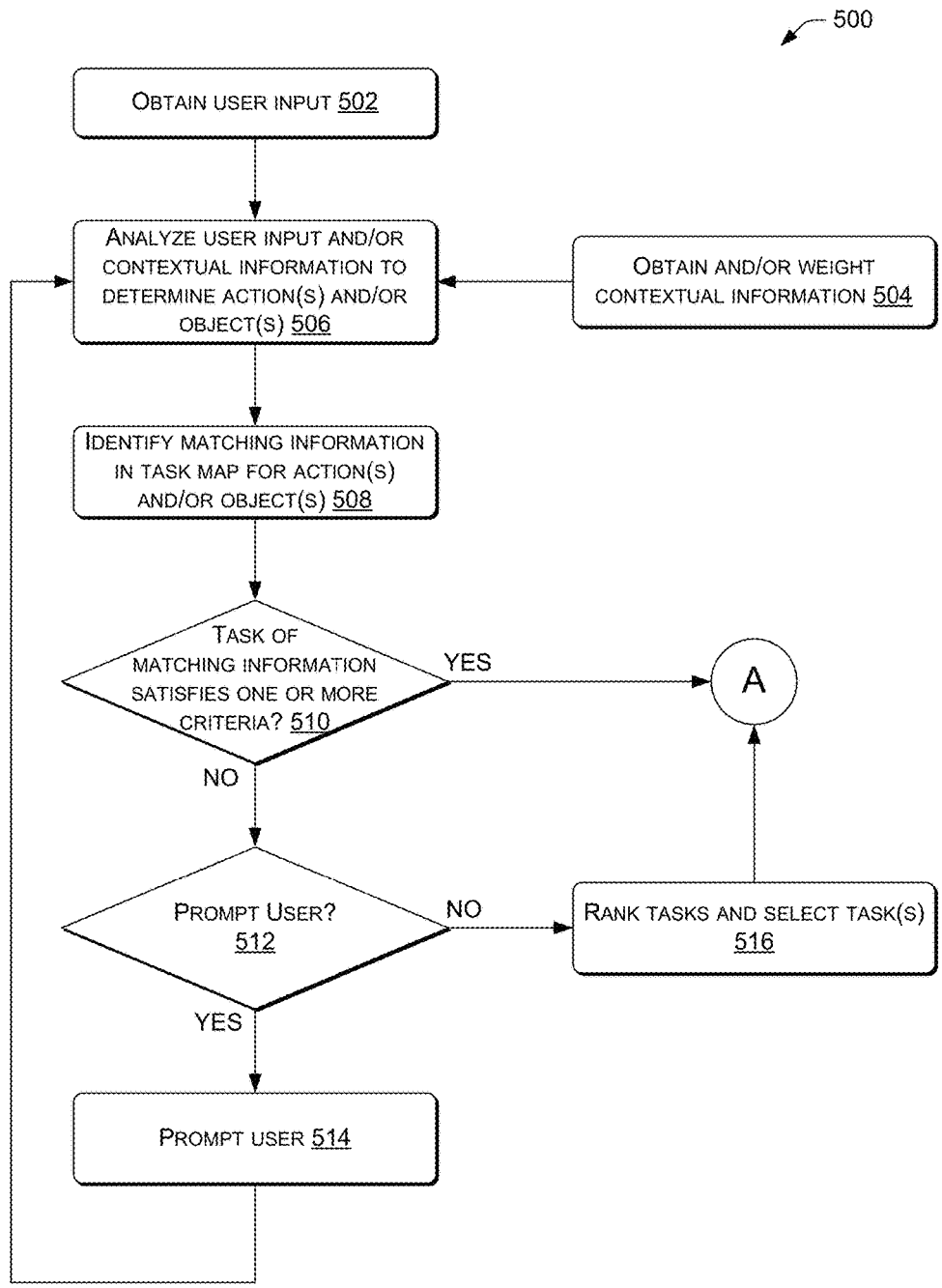
FIGS. 5A-5B illustrate an example process to determine a task to be performed by a virtual assistant.
Figure 5B:
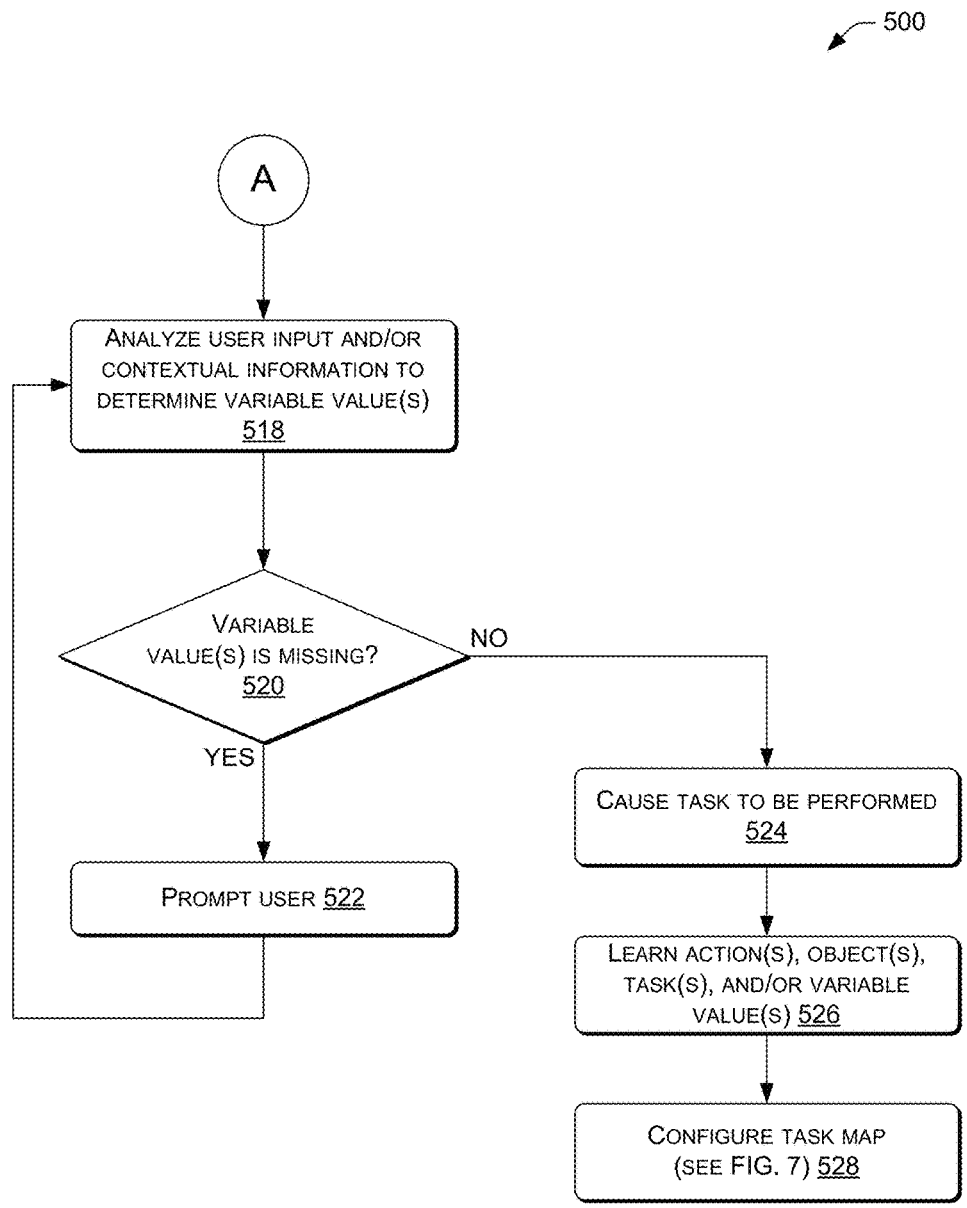
Figure 6:
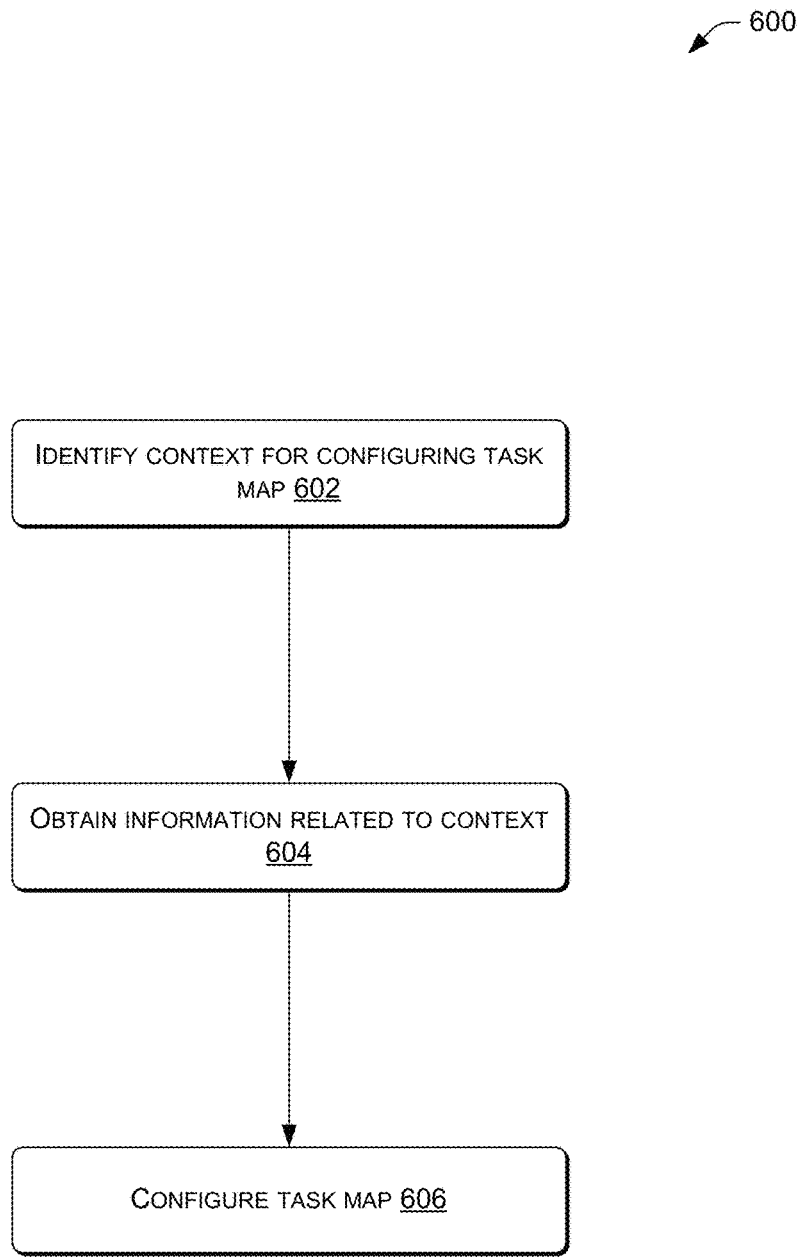
FIG. 6 illustrates an example process to configure a task map of a virtual assistant.

FIGS. 5A, 5B, and 6 illustrate example processes 500 and 600 for employing the techniques described herein. For ease of illustration processes 500 and 600 are described as being performed in the architecture 100 of FIG. 1. For example, one or more of the individual operations of the processes 500 and 600 may be performed by the smart device 102 and/or the virtual assistant service 116. In many instances, the processes 500 and 600 are implemented at least in part by the virtual assistant 112. However, the processes 500 and 600 may be performed in other architectures. Moreover, the architecture 100 may be used to perform other processes.

The processes 500 and 600 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be omitted.

FIGS. 5A-5B illustrate the example process 500 to determine a task to be performed by a virtual assistant.

At 502 in FIG. 5A, the virtual assistant service 116 may obtain user input from the smart device 102. The user input may be received at the smart device 102 during a conversation between a user and the virtual assistant 112. The user input may be sent to the virtual assistant service 116 for processing.

At 504, the virtual assistant service 116 may obtain contextual information and/or weight the contextual information. The contextual information may include, for example, conversation history of the user with the virtual assistant 112, content output history that identifies content that has been consumed by the user, user preference information, device information indicating a type of device that is being used by the user, and so on. In some instances, a piece of contextual information may be weighted more or less heavily than another piece of contextual information (e.g., weighted toward providing more or less impact than another piece of contextual information). The weighting may be based on a time associated with contextual information (e.g., a time that the contextual information was created), a predetermined value, and so on. For example, if a user had a conversation with the virtual assistant 112 yesterday (e.g., within a predetermined time period), the conversation with the virtual assistant 112 may be weighted more heavily than other contextual information that was created last week, such as content output history that indicates what the user viewed on the web last week. In another example, a user preference may be weighted more heavily than a current time of day based on a predetermined weighting scheme, which may be configurable by a user.

At 506, the virtual assistant service 116 may analyze the user input and/or contextual information to determine (e.g., identify) an action(s) and/or an object(s). This may include utilizing various input processing techniques, such as POST, probabilistic or statistical speech modeling, NLP, pattern recognition language modeling, and so on. An action and/or an object may be expressly found in the user input (e.g., identifying an action of "send" for input of "please send a text message"), determined based on an analysis of the user input (e.g., determining an action of "purchase" for input of "I want to buy a new coat," where "purchase" corresponds to a synonym for "buy"), and so on. An action may comprise a verb, while an object may comprise a noun (e.g., proper noun or common noun).

In some instances, the operation 506 may include determining all candidate actions and/or objects for the user input (e.g., all possible actions and/or objects). Each identified action or object may be associated with a confidence score indicating an estimated level of accuracy that the action or object was correctly identified. To illustrate, if a user states "I want to buy a new coat," the virtual assistant service 116 may identify an action of "want" as being associated with a relatively low confidence score and identify an action of "buy" as being associated with a relatively high confidence score.

In some instances, contextual information may be used to identify an action and/or object and/or to assign a confidence score to the action and/or object. As noted above, the contextual information may be weighted in some examples. In returning to the illustrative input of "I want to buy a new coat," the virtual assistant service 116 may reference a recent conversation in which the user requested directions to a clothing store to purchase a coat. Based on this conversation, an action of "want" may be assigned a relatively high confidence score, while an action of "buy" may be assigned a relatively low confidence score. These confidence scores may suggest that the user is more interested in purchasing the coat at the store (e.g., an action-object pair of want-coat that is associated with a task of creating a reminder to purchase the coat upon arrival at the store), rather than purchasing the coat through a phone (e.g., an action-object pair of buy-coat that is associated with a task of navigating to an online e-commerce site).

At 508, the virtual assistant service 116 may identify matching information in a task map for the action(s) and/or object(s) determined at 506. For instance, the virtual assistant service 116 may identify actions and objects in the task map that correspond to all candidate action(s) and/or object(s) determined at 506. To illustrate, if the task map is represented as a table with columns for actions, objects, and tasks (e.g., the example task map 124 illustrated in FIG. 1), then the virtual assistant service 116 may identify each row that includes at least one piece of matching information (e.g., at least one action or object determined at 506).

At 510, the virtual assistant service 116 may determine whether or not a task that is associated with matching information in the task map satisfies one or more criteria, such as being the only task that is associated with matching information and/or being associated with a confidence score that is greater than a threshold. This may generally include an initial determination as to whether or not a task is identified to be performed. For example, the virtual assistant service 116 may reference the task map to determine if the matching information in the task map corresponds to a single task (e.g., a single row is identified). In another example, the virtual assistant service 116 may determine whether or not a task that is associated with matching information in the task map is associated with a confidence score that is greater than a threshold. A confidence score of a task may be based on confidence scores of associated actions and/or objects. To illustrate, a task may be associated with a relatively high confidence score, in comparison to another task, when an action and object of the task are associated with relatively high confidence scores.

When a task that is associated with matching information does not satisfy the one or more criteria, the process 500 may proceed to 512 (e.g., the NO path). In many instances, the process 500 may proceed to 512 when the matching information in the task map corresponds to multiple tasks. Alternatively, when a task that is associated with matching information satisfies the one or more criteria, the process 500 may proceed to FIG. 5B (e.g., the YES path).

At 512, the virtual assistant service 116 may determine whether or not to prompt the user for additional information regarding task performance. This may include determining whether or not a setting has been set to prompt the user. This setting may be configured by end-users, users of the virtual assistant service 116, applications, and so on. When it is determined to prompt the user, the process 500 may proceed to 514 (e.g., the YES path). Alternatively, when it is determined to not prompt the user, the process 500 may proceed to 516 (e.g., the NO path).

At 514, the virtual assistant service 116 may prompt the user for input regarding what task the user is requesting to be performed. This may include sending an instruction to the smart device 102 to prompt the user for information that clarifies what task the user is requesting to be performed. Here, the virtual assistant service 116 may provide the user with information that the virtual assistant service 116 has identified, such as an identified action, object, or task. In returning to the illustrative input of "I want to buy a new coat," the virtual assistant service 116 may identify a candidate task of setting a reminder based on an identified action-object pair of want-coat and may identify another candidate task of purchasing the coat based on an identified action-object pair of purchase-coat. Here, the user may be asked "Would you like to set a reminder to purchase the coat or purchase the coat through an online site?" When user input is received, the process 500 may return to 506 and analyze the user input and/or contextual information to determine actions and/or objects in order to further narrow down what task the user is requesting.

In some instances at 514, the conversation between the virtual assistant 112 and the user may be goal-based. In a goal-based conversation (e.g., dialog), the virtual assistant service 116 may seek to accomplish a goal, such as collecting a threshold amount of information to identify a task. The conversation between the user and the virtual assistant 112 may be substantially driven by input of the user. To illustrate, if the virtual assistant service 116 is attempting to identify a task to perform, the virtual assistant 112 may ask questions and/or receive user input until a task is identified. If the user asks a question that is not related to identifying a task, the virtual assistant 112 may seek to resolve the question and return back to the task identification conversation.

At 516, the virtual assistant service 116 may rank multiple tasks that are associated with matching information in the task map and may select a task(s) from the ranking. This may be useful when the virtual assistant service 116 has identified multiple candidate tasks from the task map (e.g., potential tasks). The ranking may be based on confidence scores associated with the multiple tasks. In returning to the illustrative input of "I want to buy a new coat," the virtual assistant service 116 may identify a candidate task of setting a reminder (e.g., a row within the task map that includes a matching action and/or object) and another candidate task of purchasing the coat (e.g., another row within the task map that includes a matching action and/or object). The virtual assistant service 116 may then, for example, rank the task of purchasing the coat higher than the task of setting a reminder based on the purchasing task being associated with a higher confidence score. As noted above, a confidence score of a task may be based on a confidence score of associated actions and/or objects, which may be based on contextual information. The virtual assistant service 116 may then select a task(s) that ranks the highest/lowest (or the $n^{th}$ highest/lowest) within the ranking.

At 518 in FIG. 5B, the virtual assistant service 116 may analyze user input and/or contextual information to determine a variable value for performing a task. A variable value may include a value for a variable that is used to perform a task (also referred to as a value for a task variable). For example, in order to perform a task of purchasing a flight, particular variable values may be gathered, such as a departure location, a destination location, an airline, a type of seat requested (e.g., first class, coach, etc.), a date of departure, and so on. Accordingly, the analysis at 518 may generally seek to identify variable values from the user input obtained at 502, the user input received in response to prompting the user at 514, and/or the contextual information obtained and/or weighted at 504. The analysis may include referencing a variable(s) associated with a task and analyzing user input and contextual information to determine if a term or phrase in the user input or contextual information matches a word type of a variable(s) (e.g., noun, verb, adjective, etc.) and/or a category of a variable(s) (e.g., location, number, item, food, or any general classification of a word or variable). Although operation 518 is illustrated as a separate operation, in some instances, the operation 518 may be performed at operation 506 or at other locations.

To illustrate the analysis of 518, assume a task of purchasing a flight has been identified, which is associated with a destination variable (e.g., city category). Here, the virtual assistant service 116 may search within user input and/or contextual information for a destination city (e.g., which may be included within the user input, described in user preference information, etc.). If, for example, the user previously had a conversation about traveling to Seattle, the virtual assistant service 116 may identify Seattle as the value for the destination variable. Additionally, a departure city of Spokane may be identified based on the user's current location, namely Spokane, and a seat type may be identified based on a seat preference that the user has set.

At 520, the virtual assistant service 116 may determine whether or not a variable value(s) for performing a task is missing. If a predetermined number of variable values is missing for a task (e.g., more than 1 or 2), the process 500 may proceed to 522 (e.g., the YES path). Alternatively, if the predetermined number of variable values is not missing, the process 500 may proceed to 524 (e.g., the NO path).

At 522, the virtual assistant service 116 may prompt the user for the missing variable value(s). This may include sending an instruction to the smart device 102 to prompt the user for the missing variable value(s). In some instances, this may also include informing the user of the variable values that have been gathered. For example, if the variable value for an airline is missing, the virtual assistant service 116 may ask "What airline would you like to use for your flight?" Upon receiving user input, the process 500 may return to 518 and analyze the user input and/or contextual information. In some examples, the operation 522 may include performing a goal-based dialog for each of the variables (e.g., carrying out separate requests to the user for each variable value).

At 524, the virtual assistant service 116 may cause the task to be performed (e.g., by the virtual assistant 112). This may include performing the task at the virtual assistant service 116, sending an instruction to the smart device 102 to perform the task, sending an instruction to another device, and so on. If the task is associated with variables, the values for the variables may be used to perform the task.

At 526, the virtual assistant service 116 may learn information to be associated with a task, such as an action(s), object(s), and/or variable value(s). In general, the virtual assistant service 116 may seek to identify a task that was desired by a user for input. In one example, the virtual assistant service 116 may identify input that is received from a user during a conversation and determine whether or not one or more criteria are satisfied to classify a particular task that was performed by the virtual assistant 112 for the input as an accurately identified task. The one or more criteria may be satisfied when the user views a response of the virtual assistant 112 for more than a predetermined amount of time, the user continues a conversation with the virtual assistant 112 (e.g., provides further input that does not clarify the previous input), the virtual assistant 112 confirms that it did the correct task through direction questioning (e.g., ask the user if a performed task was the task he desired), or the user otherwise acts to indicate that the virtual assistant 112 performed a task that the user desired. When the one or more criteria are not satisfied (e.g., the performed task was not desired), the virtual assistant service 116 may identify a task that was initiated by the user after the particular task was performed by the virtual assistant 112 (e.g., the user accessing an app, navigating to content, etc.). The virtual assistant service 116 may then identify an action and/or an object of the input to be associated with the task that was initiated by the user. In some instances, at 526 the virtual assistant 112 may ask the user if it should apply learned information to future conversations. By performing learning techniques, the virtual assistant service 116 may learn a task that is to be associated with an action and/or object that is determined for input.

To illustrate, assume that the user states "let's jam" in an effort to listen to music and the virtual assistant service 116 incorrectly interprets this input as corresponding to a different task (e.g., searching for fruit jam on the internet), which is then performed and a response is sent to the user. Here, the user may have ignored the response of the virtual assistant 112 (e.g., closed a browser window, quickly moved on to something else, etc.) and opened a music application to listen to music. Accordingly, in this illustration the virtual assistant service 116 may learn that the particular action-object pair that is determined for "let's jam" is to be associated with the task of playing music.

In another illustration, assume that the user requests "how did my team do last night?" in an effort to navigate to a particular baseball team's site and the virtual assistant service 116 has returned a home page of a sports site (e.g., the home page of ESPN®). Here, the user may navigate from that home page to a specific page for the particular baseball team. Thus, the virtual assistant service 116 may learn that the object determined for "my team" is to be associated with the particular baseball team. That is, the virtual assistant service 116 may learn that the action-object pair that is determined for "how did my team do last night?" is to be associated with a task of navigating to the specific page of the particular baseball team.

In a further illustration, the virtual assistant service 116 may learn a variable value based on a conversation between the user and the virtual assistant 112. For example, the virtual assistant service 116 may learn that when the user refers to "Jaime," the user is actually referring to "James" who is listed as a contact on the user's device (e.g., the user says "send a text message to Jaime . . . oh wait I mean James," the user corrects a to-field to "James" for a text message that is generated by the virtual assistant 112 as a response to "send a text message to Jaime," etc.).

The learning at 526 may alternatively, or additionally, be based on explicit input from the user requesting an association. To illustrate, the virtual assistant service 116 may learn that a task of playing music is to be associated with an action-object pair that is determined for "let's jam" based on input from a user of "please associate let's jam with playing music." In some instances, the input is received through a user interface that enables customization of task and action-object relationships, such as the interface 400 of FIG. 4.

At 528, the virtual assistant service 116 may configure a task map. This may include associating an action, object, and/or variable value with a task based on the learning at 526. In returning to the example above where the virtual assistant service 116 has learned that input of "let's jam" is to be associated with the task of playing music, the virtual assistant service 116 may associate an action-object pair that is determined for "let's jam" with the task of playing music. Alternatively, or additionally, a task map may be configured according to the process 600 of FIG. 6.

Although the operations 526 and 528 are illustrated at the end of the process 500, these operations, and/or any other operations, may be performed at any time during the process 500.

FIG. 6 illustrates the example process 600 to configure a task map of a virtual assistant.

At 602, the virtual assistant service 116 may identify a context for configuring a task map. The task map may map tasks to be performed by a virtual assistant to action-object pairs. The context may comprise, for example, an industry to which the virtual assistant 112 is to be deployed (e.g., field of use), a platform for which the virtual assistant 112 is to be deployed, a device type for which the virtual assistant 112 is to be deployed, a user for which the virtual assistant 112 is to be deployed, and so on.

At 604, the virtual assistant service 116 may obtain information related to the context. The information may include, for example, one or more terms or phrases that are used for an industry, platform, device type, etc. In another example, the information may comprise contextual information related to a user.

At 606, the virtual assistant service 116 may configure the task map for the context. This may include assigning a task to a particular action-object part based on the information related to the context. For example, the virtual assistant service 116 may select a task based on the information related to the context and associate the task with a particular action-object pair. To illustrate, if the virtual assistant 112 is to be deployed into an airline industry application, then an action-object pair of provide-status may be associated with a task of providing a flight status (e.g., instead of a task of providing other status information, as may be the case in another industry). In another example, if the virtual assistant 112 is to be deployed on a mobile platform (e.g., mobile operating system), then an action-object pair of provide-directions may be associated with a task of opening a navigation app (e.g., instead of a task of opening a directions-based web site, as may be the case in another platform).

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. One or more computer-readable storage media storing computer-readable instructions that, when executed, instruct one or more processors to perform operations comprising:
   obtaining user input that is received at a smart device during a conversation between a user and a virtual assistant;
   identifying context associated with at least one of the user or the smart device;
   selecting, based at least in part on the context, a task map from a plurality of task maps that map a plurality of actions or a plurality of objects to tasks of the virtual assistant;
   analyzing the user input to determine an action from the plurality of actions and an object from the plurality of objects;
   determining, based at least in part on the task map, that at least one of the action or the object is mapped to a first task;
   causing the first task to be at least partly performed by the virtual assistant;
   determining that a second task was initiated by the user subsequent to the first task being performed; and
   based at least in part on the second task being initiated by the user subsequent to the first task being performed, updating the task map by mapping at least one of the action or the object to the second task in the task map.

2. The one or more computer-readable storage media of claim 1, wherein the action comprises a verb and the object comprises a noun.

3. The one or more computer-readable storage media of claim 1, wherein the operations further comprise:
   upon determining that the at least one of the action or the object is mapped to the first task, identifying a variable for performing the task; and
   obtaining a value for the variable by at least one of causing the user to be prompted for further user input or analyzing the context.

4. The one or more computer-readable storage media of claim 1, wherein the operations further comprise:
   learning information to be associated with the first task based at least in part on the conversation between the user and the virtual assistant, the information comprising at least one of the action, the object, or a value of a variable for the first task.

5. The one or more computer-readable storage media of claim 1, wherein the context associated with at least one of the user or the smart device comprises at least one of:
   a particular industry associated with at least one of the user or the virtual assistant;
   a platform of the smart device;
   a type of the smart device;
   a type of the user; or
   a location associated with the user.

6. The one or more computer-readable storage media of claim 1, the operations further comprising:
   determining that the first task is associated with a confidence score higher than a threshold confidence score;
   and wherein the causing the first task to be at least partly performed by the virtual assistant is based at least in part on determining that the first task is associated with the confidence score higher than the threshold confidence score.

7. A method comprising:
   under control of one or more computing devices configured with executable instructions,
   causing a conversation user interface to be output on a smart device to enable a conversation between a user of the smart device and a virtual assistant;
   learning information to be associated with a first task to be performed by the virtual assistant based at least in part on the conversation of the virtual assistant with the user, the information comprising at least one of an action, an object, or a value of a task variable, wherein the learning comprises:
      identifying input that is received from the user during the conversation;
      analyzing the input to identify the action and the object;
      identifying, based at least in part on a task map that maps a plurality of actions or a plurality of objects to tasks of the virtual assistant, a second task that is mapped to at least one of the action or the object;
      performing the second task;
      identifying that the user initiated the first task after the second task was performed;
      based at least in part on identifying that the first task was initiated by the user, identifying at least one of the action or the object of the input to be associated with the first task that was initiated by the user; and
      associating at least one of the action, the object, or the value of the task variable with the first task by mapping at least one of the action, the object, or the value of the task variable to the first task in the task map.

8. The method of claim 7, wherein the learning further comprises:
   identifying a request that is received from the user during the conversation, the request requesting to associate a particular term or phrase with the first task.

9. The method of claim 7, wherein the input is received through a user interface that enables the user to associate a task with an action-object pair.

10. One or more computer-readable storage media storing computer-readable instructions that, when executed, instruct one or more processors to perform operations comprising:
    identifying a context for configuring a task map of a virtual assistant, the task map mapping tasks to be performed by the virtual assistant to action-object pairs, the context comprising an industry to which the virtual assistant is to be deployed;
    obtaining information related to the context, the information comprising one or more terms or phases that are used within the industry;
    configuring the task map for the context by assigning at least one task of the tasks to a particular action-object pair based at least in part on the information related to the context;
    receiving input from a user and via a conversation interface output on a device;
    analyzing the input to identify an action-object pair;
    identifying, based at least in part on the task map, a first task to which the action-object pair is mapped;
    causing the virtual assistant to perform the first task;
    determining that a second task was initiated by the user subsequent to the first task being performed; and
    based at least in part on determining that the second task was initiated by the user subsequent to the first task being performed, updating the task map by mapping the object-action pair to the second task in the task map.

11. The one or more computer-readable storage media of claim 10, wherein:
    the context comprises a platform for which the virtual assistant is to be deployed; and the information related to the context comprises one or more terms or phrases that are used in association with the platform.

12. The one or more computer-readable storage media of claim 10, wherein:
   the context comprises a device type for which the virtual assistant is to be deployed; and
   the information related to the context comprises one or more terms or phrases that are used in association with the device type.

13. The one or more computer-readable storage media of claim 10, wherein:
   the context comprises a user for which the virtual assistant is to be deployed; and
   the information related to the context comprises at least one of a current conversation history of the user with the virtual assistant, a previous conversation history of the user with the virtual assistant, input of the user that requests that the at least one task be associated with the particular action-object pair, content output history of the user that identifies content that has been output to the user, user preference information indicating one or more preferences of the user, or device information indicating a type of device that is used by the user.

14. A method comprising:
   under control of one or more computing devices configured with executable instructions,
   causing a conversation user interface to be output on a smart device associated with a user to enable a conversation between the user of the smart device and a virtual assistant;
   receiving, via the user interface on the smart device, a phrase containing an action and an object;
   identifying, based at least in part on a task map that maps a plurality of actions or a plurality of objects to tasks of the virtual assistant, a first task that is mapped to at least one of the action or the object;
   performing the first task;
   determining that the user initiated a second task after the first task was performed; and
   based at least in part on determining that the user initiated the second task after the first task was performed, updating the task map by mapping at least one of the action or the object to the second task in the task map.

15. The method of claim 14, further comprising:
   identifying a variable for performance of the first task;
   obtaining a value for the variable by at least one of (i) analyzing contextual information that is related to at least one of the conversation or the user or (ii) causing the user to be prompted for the value of the variable; and
   updating the task map by mapping the value of the variable to the second task.

16. The method of claim 15, wherein the obtaining the value for the variable comprises determining that a term or phrase in the contextual information corresponds to the value for the variable based on at least one of a word type or category of the term or phrase.

17. The method of claim 15, wherein obtaining the value for the variable includes utilizing a goal-based dialog.

18. The method of claim 14, wherein the virtual assistant is configured for at least one of multi-modal input/out, multi-language communication, or multi-channel communication.

* * * * *